US006385658B2

(12) United States Patent
Harter, Jr. et al.

(10) Patent No.: US 6,385,658 B2
(45) Date of Patent: May 7, 2002

(54) METHOD AND APPARATUS FOR SYNCHRONIZED MESSAGE PASSING USING SHARED RESOURCES

(75) Inventors: Paul Karl Harter, Jr.; James Ian Fraser, Jr., both of Groton, MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 08/883,997

(22) Filed: Jun. 27, 1997

(51) Int. Cl.[7] ................................................. G06F 9/54
(52) U.S. Cl. ...................................................... 709/312
(58) Field of Search ................................ 709/300, 312; 710/52, 53

(56) References Cited

U.S. PATENT DOCUMENTS

| 5,315,707 A | * | 5/1994 | Seaman et al. ................ 710/56 |
| 5,572,697 A | * | 11/1996 | Chevalier et al. ........... 711/100 |
| 5,644,575 A | * | 7/1997 | McDaniel .................... 370/416 |
| 5,742,793 A | * | 4/1998 | Sturges et al. .............. 711/152 |
| 5,887,168 A | * | 3/1999 | Bahls et al. ................. 709/314 |

OTHER PUBLICATIONS

Black, et al. "FLIPC: A Low Latency Messaging System for Distributed Real Time Environments" USENIX. pp. 1–13, Jan. 1996.*

(DRUSCHEL) Druschel, Peter et al. "Experiences with a High–Speed Network Adaptor: A Software Perspective". pp. 3–4, Shared Data Structure, Aug. 1994.*

Duntemann, Jeff. "Borland Pascal from Square One", Jun. 1993.*

* cited by examiner

*Primary Examiner*—St. John Courtenay, III
*Assistant Examiner*—Lewis A. Bullock, Jr.
(74) *Attorney, Agent, or Firm*—Hamilton, Brook, Smith & Reynolds, P.C.

(57) ABSTRACT

Techniques used in communicating messages between processes are described using a shared message buffer pool and incoming message lists associated with each process. Associated with each process is message management information. Using the message management information, incoming messages to a process are retrieved, outgoing messages to another process are sent, and message buffers are allocated as needed from a free message buffer list. The free message buffer list is a shared resource from which processes obtain a free message buffer to send a message to another process. Access to the shared free message buffer list and process message lists is synchronized through discipline imposed upon updating and accessing various fields of the data structure without requiring a global locking mechanism for synchronization of shared resources.

15 Claims, 12 Drawing Sheets

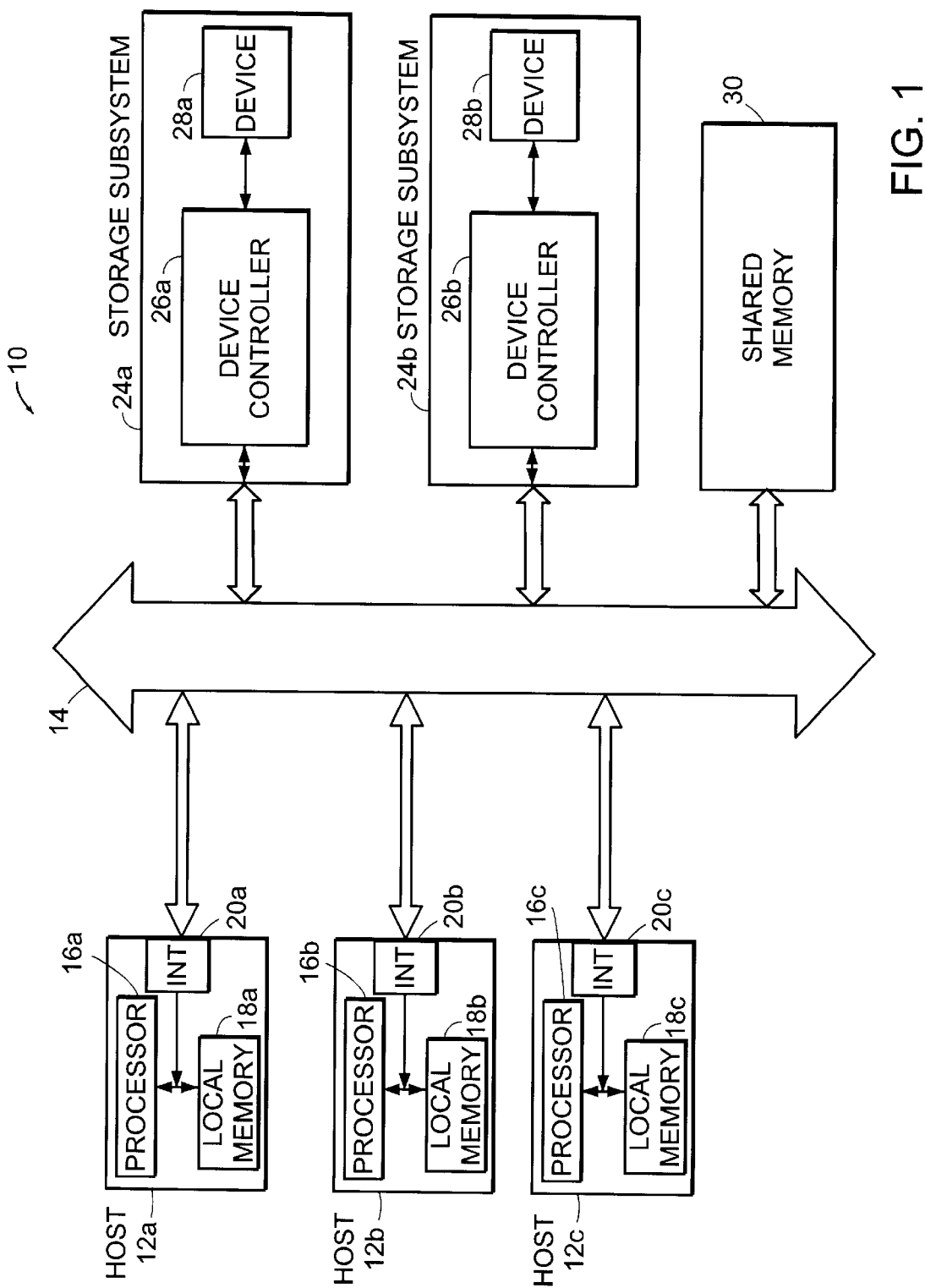

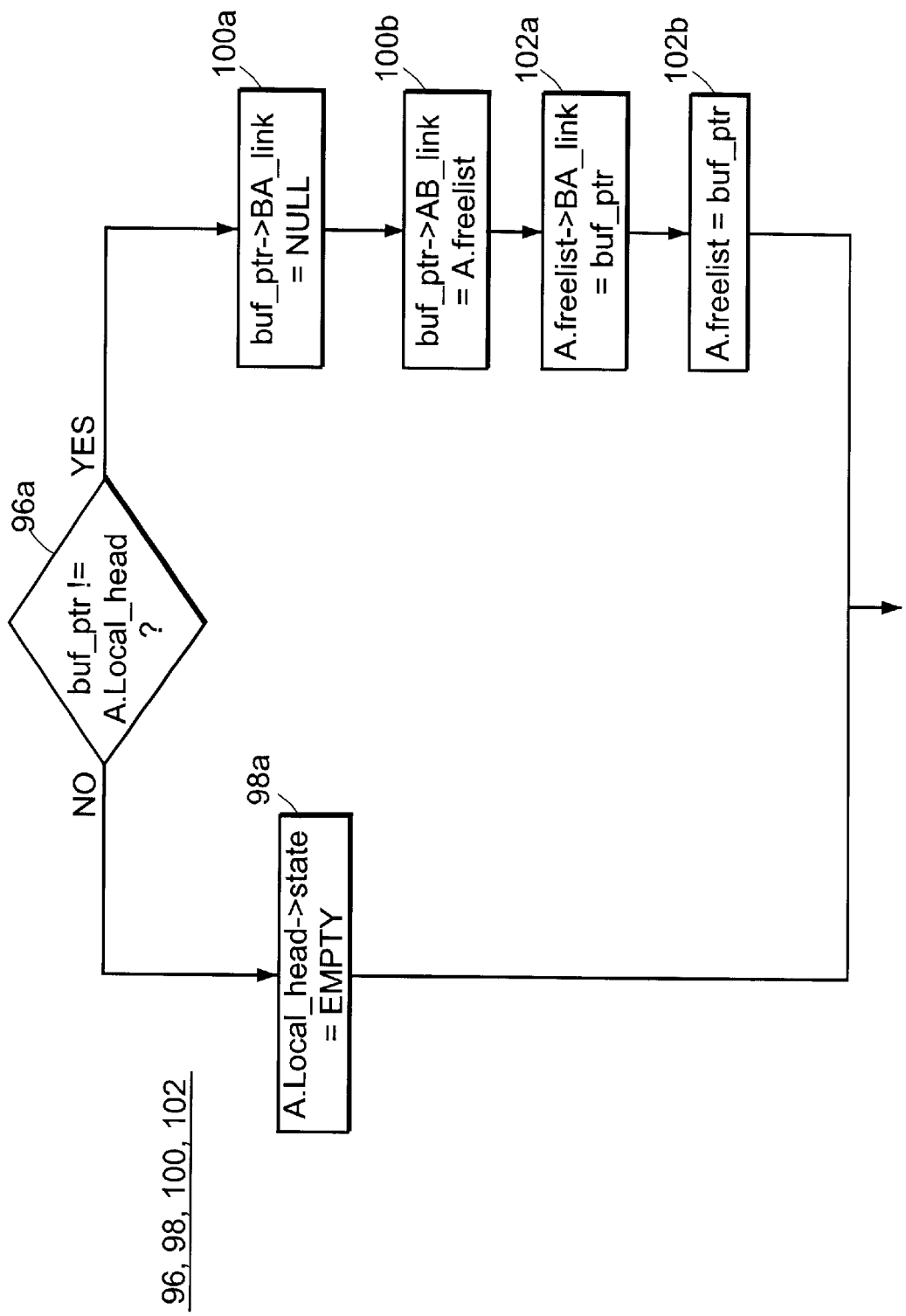

METHOD AND APPARATUS FOR SYNCHRONIZED MESSAGE PASSING USING SHARED RESOURCES

BACKGROUND OF THE INVENTION

This invention relates generally to communications in a computer system and more particularly to performing synchronized message passing in a computer system using shared resources.

As it is known in the art, message passing is one means of communicating between two or more processes. Messages can be sent between two or more processes executing in the same computer system, or between processes executing in different computer systems. Using message passing, a first process wishing to communicate with a second process sends the second process a message. The message is typically a quantity or packet of data sent from the first process to the second process.

One class of techniques for communicating messages between two processes uses a single shared list in which there is always a buffer of one element in the list. A receiving process reads and processes a first message sent from a sending process only when a second message has been added to the list, such as when the sending process sends a second message to the receiving process. In other words, the receiving process does not read, process, and delete a message until the message being accessed by the receiving process is not the same as the one being sent by the sending process. Such a technique only provides for message communication in one direction between two processes.

Another class of techniques for communicating messages between two processes, process A and process B, uses a portion of memory that is shared between processes A and B and contains two shared message lists. The first shared list includes messages sent from process A to process B, and the second shared list includes messages sent from process B to process A. Both shared lists are accessed by each of the processes A and B either to send a message to the other process, or receive its own messages. For example, the first shared list is accessed by process A to send a message to process B by adding the message to the first shared list. The first shared list is also accessed by process B to read messages it receives by removing a message from the first shared list.

Typically, data operations requiring access to one of the shared lists are included in a "critical section" of machine executable code providing exclusive access to a shared resource, such as a list, to an accessing process. Thus, when a process executes an operation in a critical section, it is guaranteed exclusive access to the shared resource.

To provide for synchronization of a shared resource within a critical section, an operating system usually employs a locking mechanism by which a shared resource, such as the foregoing two shared lists included in the portion of memory, is exclusively accessed by one of multiple processes. For example, when one of the two processes, A and B, executes a data operation in a critical section to access the first shared list, a locking mechanism insures that the other process is excluded from also accessing the first shared list. A typical example of such locking mechanisms is the semaphore.

One of the drawbacks of the foregoing technique of a critical section with a locking mechanism is the performance overhead incurred by using the locking mechanism to implement the mutual exclusion. The additional overhead includes requesting, obtaining, and releasing a lock on a shared resource each time a process is accessing the shared resource. This additional overhead adversely impacts system performance, for example, by increasing execution time and requiring computer system resources to instantiate the locking mechanism.

Another drawback of the foregoing technique occurs in the event of an uneven flow of message traffic between processes A and B. If process A sends more messages to process B than process B sends to process A, there is an uneven flow of messages between process A and process B. If processes A and B each allocate their own message buffers, as used for storing data of a message, process A may request additional memory for a message buffer to send a message to process B while process B has unused message buffers. Thus, process A may require an excessive amount of memory for message buffers while process B has message buffers available for use.

To provide for message buffer allocation while minimizing memory requirements in the event of uneven message traffic between process A and process B, a third shared list including "free" or available memory buffers is used. In other words, rather than have process A and process B each individually allocate memory for a message buffer when needed, a third shared list of available message buffers is used by both process A and process B. When process A or process B requires a message buffer to send a message, it first attempts to obtain an available message buffer from the third shared list of free message buffers.

Using this third shared list is an improvement over the previously described technique in that use of the third shared list provides for adaptive message buffer allocation that minimizes memory allocation in the event of uneven message traffic between processes. However, a drawback of the use of a third shared list is that it represents an additional resource that is shared by process A and process B. Thus, a critical section is additionally required for data operations performed to obtain an available message buffer from the shared free list. Generally, using this third shared list further degrades system performance due to the additional use of the locking mechanism.

Thus, there is required an efficient technique for bidirectional message communication between processes which does not require global locking mechanism for synchronization, and which provides adaptive message buffer allocation in the event of uneven message traffic.

SUMMARY OF THE INVENTION

In accordance with principles of the present invention, to facilitate communication between a first and second process, access to shared resources is synchronized through discipline imposed upon updating and accessing the shared resources without requiring a global locking mechanism for synchronization.

In accordance with one aspect of the invention is a method for sending messages from the first process to the second process. The method includes initializing a first message buffer containing message data, and adding the first message buffer to a list of incoming messages to the second process. Initializing the first message buffer includes setting a first flag indicating that the first message buffer contains a message not yet completely processed by the second process, and setting a first link field indicating that the first message buffer is the last message in the list of incoming messages to the second process. The list of incoming messages to the second process includes a second message buffer. The step of adding the first message buffer includes updating a second link field associated with the second message buffer to identify the first message buffer being added.

Further in accordance with another aspect of the invention is an apparatus for sending a message from a first process to a second process. The apparatus includes a first data structure, a second data structure, and a messsage buffer. The first data structure is associated with the first process and includes a remote tail pointer identifying an incoming message associated with the second process. The second data structure is associated with the second process and includes a head pointer to the incoming message list associated with the second process. The message buffer includes a link field identifying a next message in the incoming message list, and a state field indicating whether the message buffer has been processed by the second process.

Further in accordance with yet another aspect of the invention is a method for allocating a message buffer from a free list when sending a message between a first and second process. The method includes determining if the free list includes at least three message buffers and removing a message buffer from one end of the free list if there are at least three message buffers.

Thus, there is provided an efficient technique for bidirectional message communication between processes which does not require global locking mechanism for synchronization, and which provides for adaptive message buffer allocation in the event of uneven message traffic.

BRIEF DESCRIPTION OF THE DRAWINGS

The above-mentioned and other features of the invention will now become apparent by reference to the following description taken in connection with the accompanying drawings, in which:

FIG. 1 is a block diagram of a computer system;

FIG. 8B is a flowchart of an embodiment of a method depicting more detailed steps of FIG. 8A for handling message buffers after data processing is complete.

DESCRIPTION OF THE PREFERRED EMBODIMENT

Figure 2A:
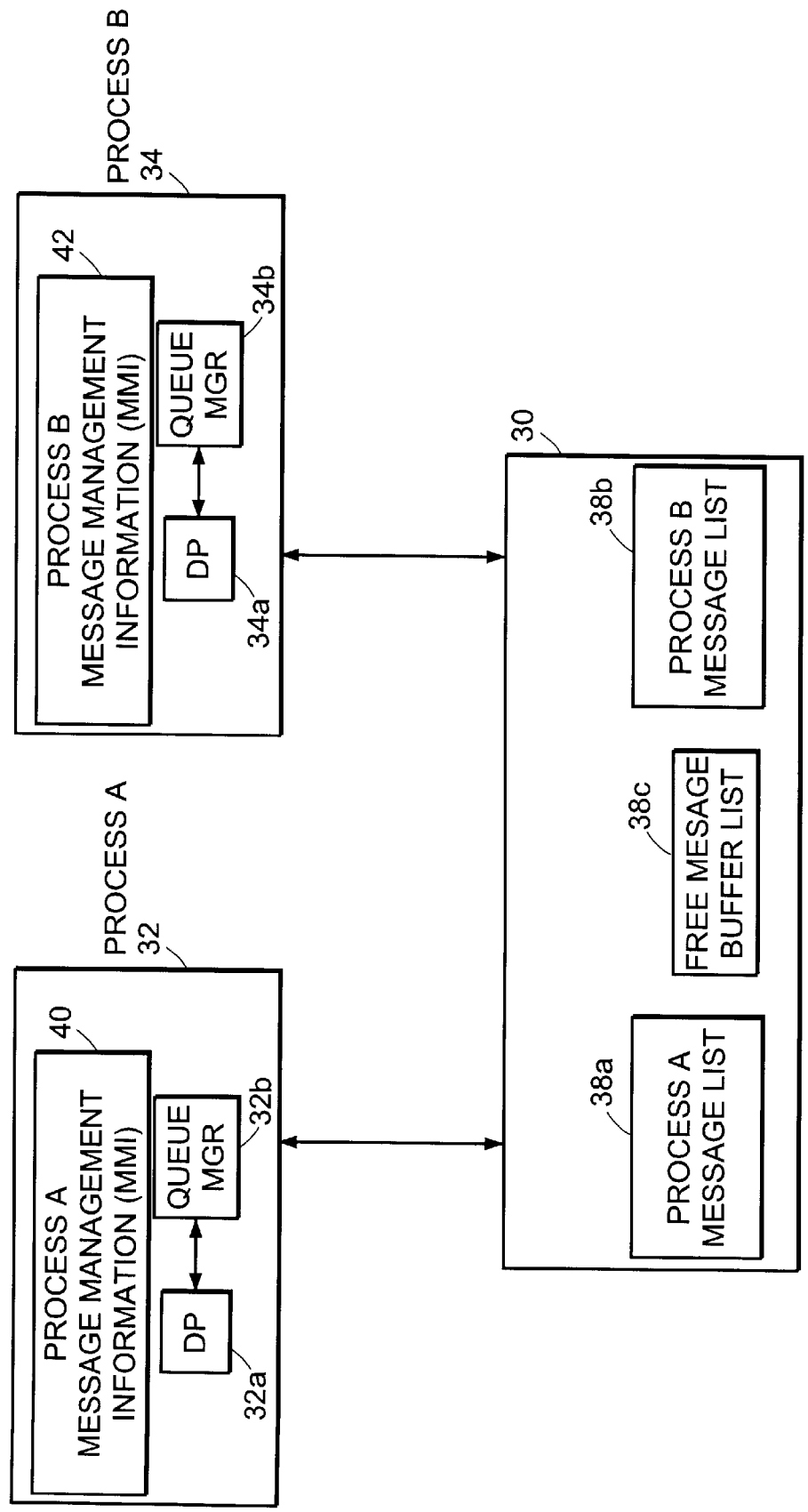
FIG. 2A is a block diagram of an embodiment of data structures and processes used in message communications between processes executing in the computer system of FIG. 1.

Referring now to FIG. 1, an embodiment of the computer system 10 is shown to include a plurality of host computers 12a–12c, a communications medium 14, storage subsystems 24a–24b, and shared memory 30. Each host 12a–12c is directly connected through a communication medium 14 to storage subsystems 24a and 24b, and shared memory 30. Host computer 12a includes a processor 16a, local memory 18a and communications interface 20a by which host computer 12a is connected to communications medium 14. Similarly, each host 12b–12c, respectively, includes a processor 16b–16c, local memory 18b–18c and communications interface 20b–20c. Each of the host systems 12b–12c are respectively connected to communication medium 14 by communications interface 20b–20c. The communication medium 14 may be, for example, a system bus.

Storage subsystem 24a includes storage device 28a which is controlled by device controller 26a. Each of the host computers 12a–12c can communicate over communications medium 14 with storage subsystems 24a and 24b. Similarly, storage subsystem 24b also includes a device controller 26b and device 28b. Each of the storage subsystems 24a–24b includes a device, such as a disk, and device controller, such as a disk controller, particular for that device included in the storage subsystem. Each of the host computer systems 12a–12c typically perform I/O operations such as read and write operations to devices 28a and 28b. Also included in FIG. 1 is shared memory 30 which can be accessed by any of the host processors 12a–12c. Generally, shared memory 30 is a shared resource for use by any of host computers 12a–12c.

It should be noted that other resources may be included in an embodiment of a computer system as shown in FIG. 1 for use between host computer systems 12a–12c. Additionally, a computer system may also contain more or fewer host computer systems than included in the embodiment of FIG. 1.

Referring now to FIG. 2A, a block diagram of an embodiment of the data structures and processes used in message communication between processes executing in a computer system of FIG. 1 is shown. Included in FIG. 2A are process A 32 and process B 34. For example, process A 32 executes in one of the host computer systems 12a–12c of FIG. 1. Similarly, process B 34 also executes in one of the host computer systems 12a–12c of FIG. 1.

One or more of the executing processes in the computer system 10 may be required to communicate with another process also executing in the computer system 10. Shown in FIG. 2 is process A 32 communicating with process B 34. Communication between process A and process B may include, for example, process A sending a message to process B, or process B sending a message to process A. Included in shared memory 30 of FIG. 2 are data structures used to facilitate communication between process A and process B. Included in shared memory 30 of FIG. 2 is a process A message list 38a, a process B message list 38b and a free message buffer list 38c. Process A message list 38a contains those messages which process A receives from process B. Similarly, process B message list 38b contains those messages received from process A. The free message buffer list 38c contains available message buffers, which a process sending a message to another process, may obtain for sending that message. The use of these data structures and the communication between process A and process B will be described in more detail in paragraphs that follow.

Process A 32 includes a data processing portion 32a (DP) and a queue manager portion 32b. Generally, the queue manager 32b and DP 32a interact to manage process A's message list 38a, and process the messages included in this message list. In particular, the queue manager 32b performs management functions of process A's message list 38a such as adding and deleting message buffers from process A's message list. Generally, DP portion 32a is responsible for processing the contents of a message included in process A's message list. Similarly, process B 34 contains a DP portion 34a and a queue manager 34b. Both process A and process B when executing in a computer system of FIG. 1 access the shared memory 30 over communications medium 14.

Also included in the local memory in which process A 32 is loaded is process A message management information (MMI) 40. Process A's MMI includes information enabling proper management of the various data structures included in shared memory 30 for process A to send and receive messages. Similarly, process B 34 contains process B message management information (MMI) 42 which is included in the local memory in which process B is loaded. Process B's MMI includes information enabling proper management of the data structures included in shared memory 30 for process B to send and receive messages. Each of the data structures included in shared memory 30 and the MMI are described in more detail in following paragraphs.

Figure 2C:
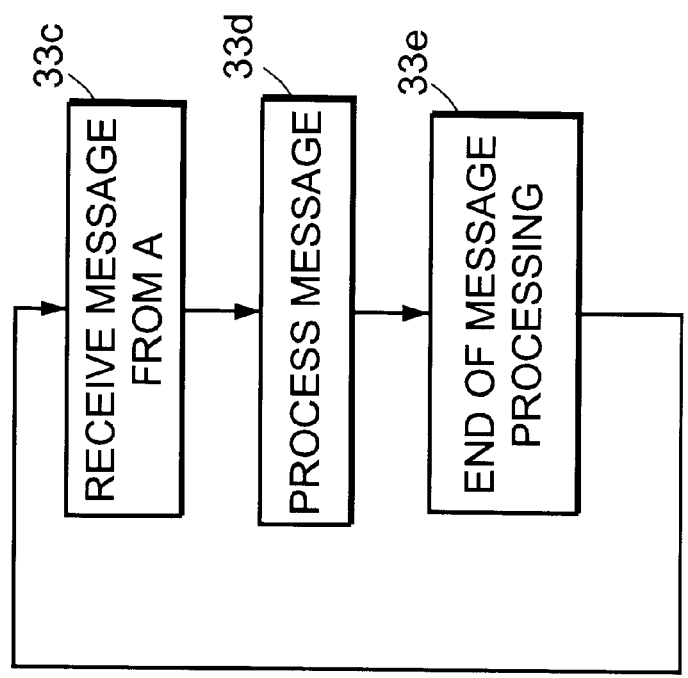
FIG. 2C is a flowchart of an embodiment of a method of receiving messages between processes executing in the computer system of FIG. 1.
Figure 2B:
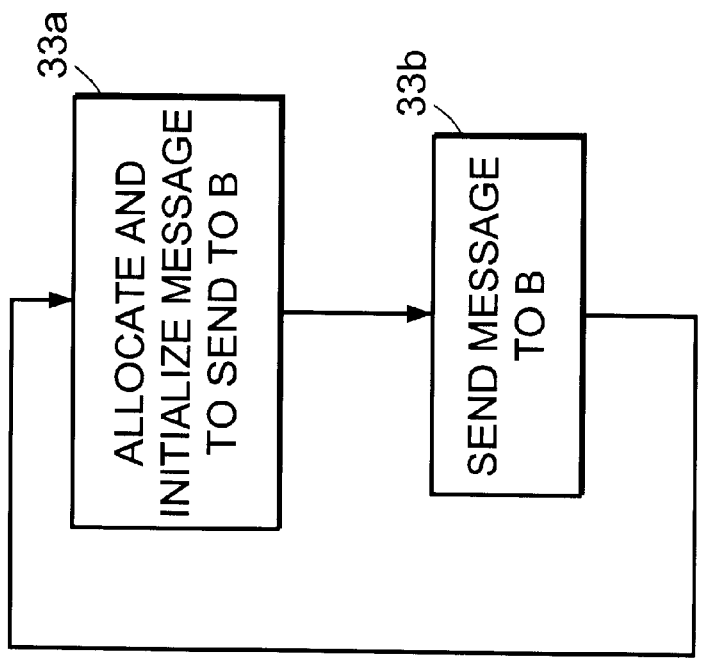
FIG. 2B is a flowchart of an embodiment of a method of sending messages between processes executing in the computer system of FIG. 1.

Referring now to FIG. 2B, shown is a flowchart of an embodiment of a method of sending a message from a sending process to a receiving process. In this example, A is the sending process sending a message to process B, the receiving process. At step 33a, a message buffer is allocated, as from the free message buffer list 38a, and initialized. At step 33b, the message from step 33a is sent to the receiving process B, as by including the message in Process B Message List 38b. Control returns to step 33a to send additional messages as needed to process B.

Referring now to FIG. 2C, shown is a flowchart of an embodiment of a method for receiving messages from a sending process. In this example, process B receives messages from a sending process, process A. At step 33c, process B determines that it has received a message from process A. As known to those skilled in the art, process B can determine that it has received a message from process A using one of a variety of techniques. For example, process B may use a polling mechanism in which process B continually checks for incoming messages after a predetermined amount of time. Process B may also use an interrupt mechanism by which process B receives an interrupt when a new message is received.

At step 33d, the newly received message is retrieved and processed by process B. When process B has completed processing the message, end of message processing is performed, as in step 33e, in which the message buffer including the message just processed may be returned to the free message buffer list 38a in accordance with other conditions and principles of the invention that are described in following paragraphs.

Figure 3:
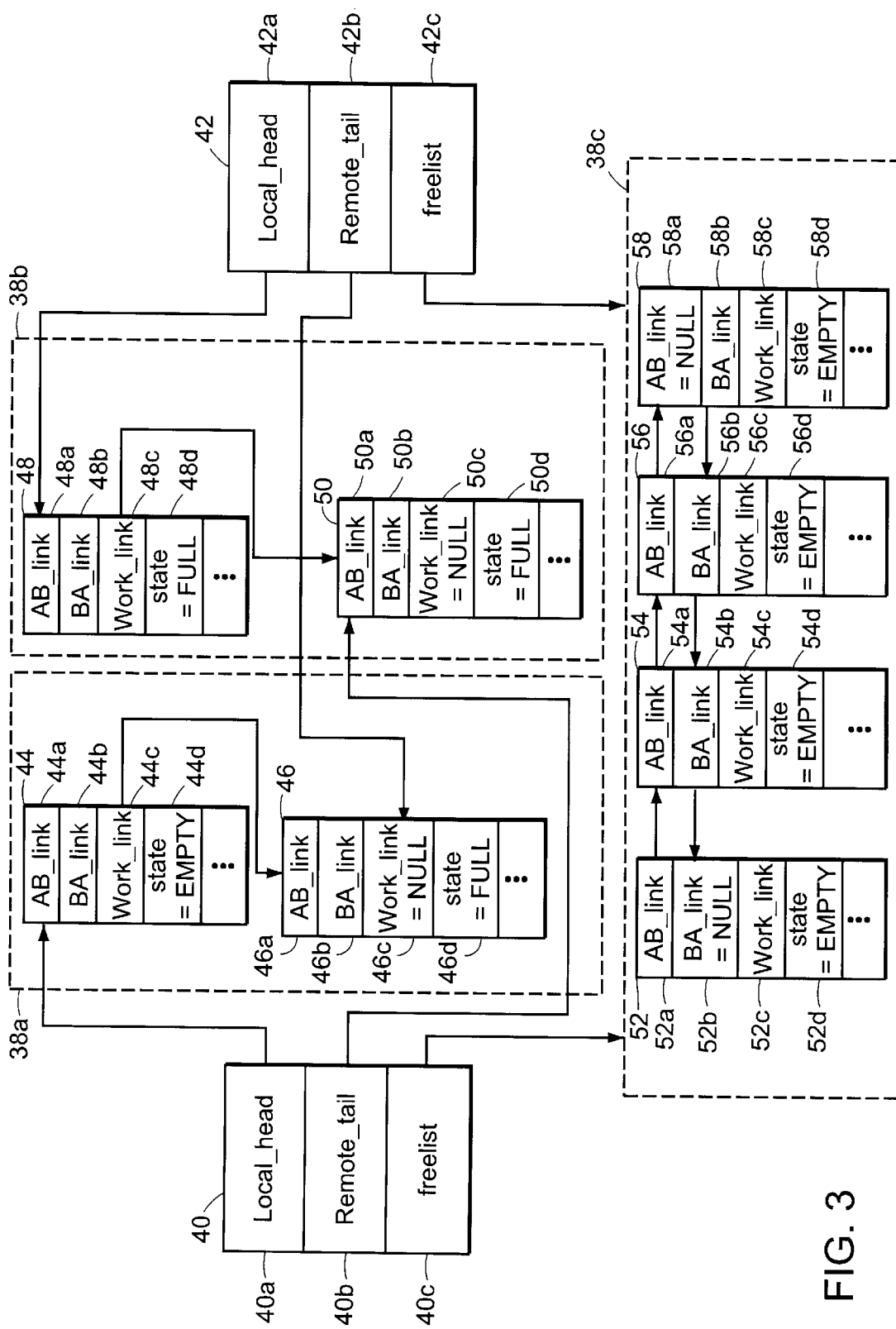
FIG. 3 is a block diagram of an embodiment of the data structures of FIG. 2 used in interprocess message communication.

Referring now to FIG. 3, shown is a block diagram of an embodiment of data structures included in FIG. 2. It should be noted that these data structures represent a "snapshot" of the data structures during the execution of process A and process B. Process A's MMI 40 includes a local head pointer 40a, a remote tail pointer 40b and a free list pointer 40c. The local head pointer 40a points to the head, or first message, of the message list for process A 38a. Remote tail pointer 40b identifies the tail end or the last element on process B's message list 38b. The free list pointer 40c identifies the first message buffer in the list of free message buffers 38c available for use by process A when sending a message to process B. Similarly, process B's MMI 42 contains a local head pointer 42a identifying the first message on process B's list of incoming messages 38b. The remote tail pointer 42b identifies the last element on process A's message list 38a. Free list pointer 42c identifies the first message buffer in the list of free pointers 38c available for use by process B when sending a message to process A.

Message lists in this embodiment, such as message lists 38a and 38b, always include at least one element. At initialization prior to sending or receiving messages, each message list is initialized with a dummy message buffer element marked as "already processed". In the instant case, this "already processed" state is indicated by setting the dummy element's state field to EMPTY. Other implementations may indicate this processing state in a variety of ways dependant upon the implementation.

As will be described in paragraphs that follow, methods for subsequently managing the data structures of FIG. 3 guarantee that there will always be at least one element in each of the message lists 38a and 38b. Using these methods, processing may or may not have completed on the first element of each message list. If there is more than one element on one of the message lists, the methods guarantee that processing has not begun on the second and subsequent elements, if any, included in message list.

Process A's message list 38a shown in FIG. 3 includes two message buffers 44 and 46. Note that, as previously described, this is a "snapshot" of the data structures, such as message list 38a. Taking a "snapshot" of the data structures at other points of execution may result in different data structure states. The first message buffer 44 included in process A's message list 38a is identified by the local head pointer 40a of process A's MMI 40. Message buffer 44 contains an AB link field 44a, a BA link field 44b, a work link field 44c and a state field 44d followed by any additional data for the message to be sent to process A. It should be noted that all message buffers appearing in any of the data structures—process A message list, process B message list or the free message buffer list 38c—include these same fields. However, different fields are used in conjunction with different data structures as will be described in paragraphs that follow.

The work link field 44c and the state field 44d are used in managing the process A message list 38a. The AB link field 44a and the BA link field 44b will be described in conjunction with the free message buffer list since they are used in conjunction with the management of this data structure. Since fields 44a and 44b are not used in the management of process A's message list 38a, values for these fields are not shown. The work link field 44*c* identifies the next message buffer in the linked list of messages to be processed by process A. In FIG. 3 work link field 44*c* identifies the next message buffer in process A's message list 38*a*, which is message buffer 46. If a message buffer such as 46 is the last message buffer included in process A's message list 38*a*, its work link field 46*c* has the value NULL to indicate the end of the list. The state field, such as 44*d*, has the value of either EMPTY or FULL indicating whether the message included in the corresponding message buffer has been completely processed. Message buffer 44 has its state field 44*d* set to EMPTY indicating that process A has completed processing of the message data included in message buffer 44. In contrast, message buffer 46 contains state field 46*d* which is set to FULL indicating that the message in message buffer 46 has not yet been completely processed, for example, by the DP portion 32*a* of process A 32. Process B's message list 38*b* contains message buffers similar to those described previously in conjunction with process A's message list 38*a*.

Fields 40*a* and 40*b* of process A's MMI 40 are used in managing process A's message list 38*a* for processing A's incoming messages, and also for sending a message from process A to process B by adding a message to process B's message list 38*b*. In this example, process A's MMI 40 contains the remote tail field 40*b* identifying the last element 50 of process B's message list 38*b*. Process A sends a message to Process B by adding it to the end of Process B's message list 38*b* using remote tail pointer 40*b*. Fields 42*a* and 42*b* of Process B's MMI 42 are used similarly to Process A's fields 40*a* and 40*b*.

Used in managing the free message buffer list 38*c* are the free list fields, 40*c* and 42*c*, respectively, of the MMI data structures 40 and 42, and the AB link and the BA link fields of the message buffers, such as previously described in conjunction with message buffers 44, 46, 48 and 50. When process A is attempting to allocate a message buffer from the free message buffer list 38*c* for use in sending a message to process B, process A examines the free message buffer list using the AB link field to identify a next consecutive message buffer. In other words, the AB link fields of the message buffers contained in the free message buffer list form a chain of message buffers whose order is privately used by process A in allocating message buffers. Similarly, the BA link fields of the message buffers contained in the free message buffer list 38*c* form a chain of message buffers whose ordering is privately used by process B in allocating message buffers. Process B reads the BA link field of a first message buffer to determine whether that message buffer is available for use by process B. Process A does not read the BA link field in determining whether that message buffer is available for its use. The BA link field is private for use only in memory buffer allocation by process B. Similarly, the AB link field is a private field available for use by process A in memory buffer allocation, and is not used by process B when determining the next element available for use on the free message buffer list 38*c*.

A more detailed description of how these data structures and their fields are used in message passing between process A and process B is described in paragraphs that follow.

Figure 4:
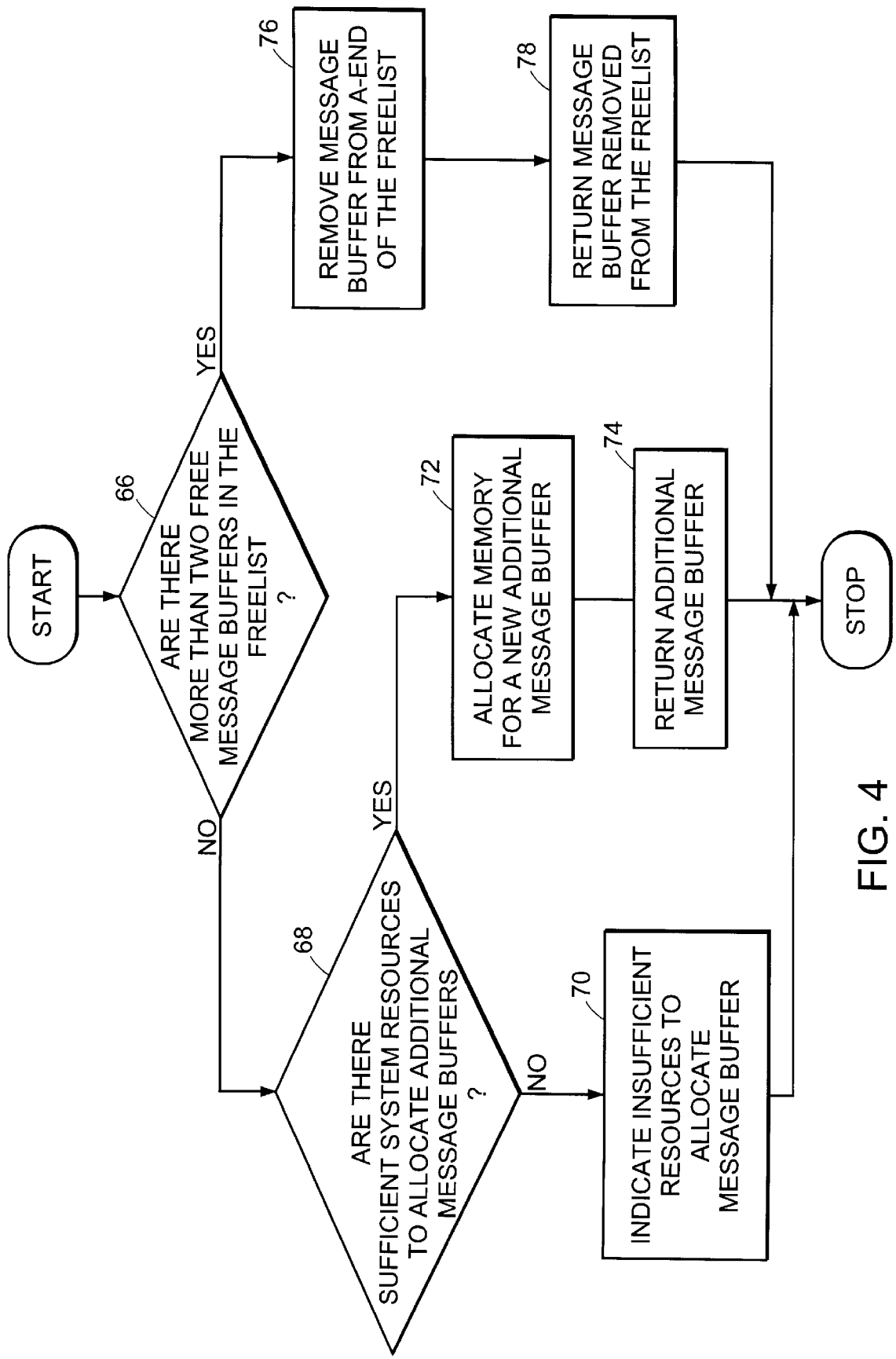
FIG. 4 is a flowchart of an embodiment of a method for allocating a buffer from a free list of available message buffers.

Referring now to FIG. 4, a flowchart of an embodiment of a method for allocating a buffer from the free list 38*c* is shown. Shown in FIG. 4 are the method steps for removing a message buffer from the A process end of the free list 38*c*, such as when process A requires a message buffer to send a message to process B. One skilled in the art will note that these steps may be generalized and modified for also sending a message from process B to process A. In step 66 a determination is made as to whether there are more than two free message buffers in the free list 38*c*. If there are more than two free message buffers in the free message buffer list 38*c*, a message buffer from the A end of the free list is removed, as in step 76. The message buffer removed from the free message buffer list 38*c* is used by process A. In this embodiment of process A 32, the queue manager portion 32*b* performs the steps of FIG. 4 to remove the message buffer from the free message buffer list 38*c* and return it for use by the DP portion 32*a*.

If a determination is made at step 66 that there are not more than two free message buffers in the free message buffer list, control proceeds to step 68 where a determination is made as to whether or not there are sufficient system resources to allocate an additional message buffer. If there are insufficient system resources to allocate an additional message buffer, control proceeds to step 70 where an indication is made that insufficient system resources are available to allocate a message buffer. If a determination is made at step 68 that there are sufficient system resources available to allocate an additional message buffer, control proceeds to step 72 where the memory for the new additional message buffer is allocated. This new message buffer is returned to process A for use in step 74.

Figure 5:
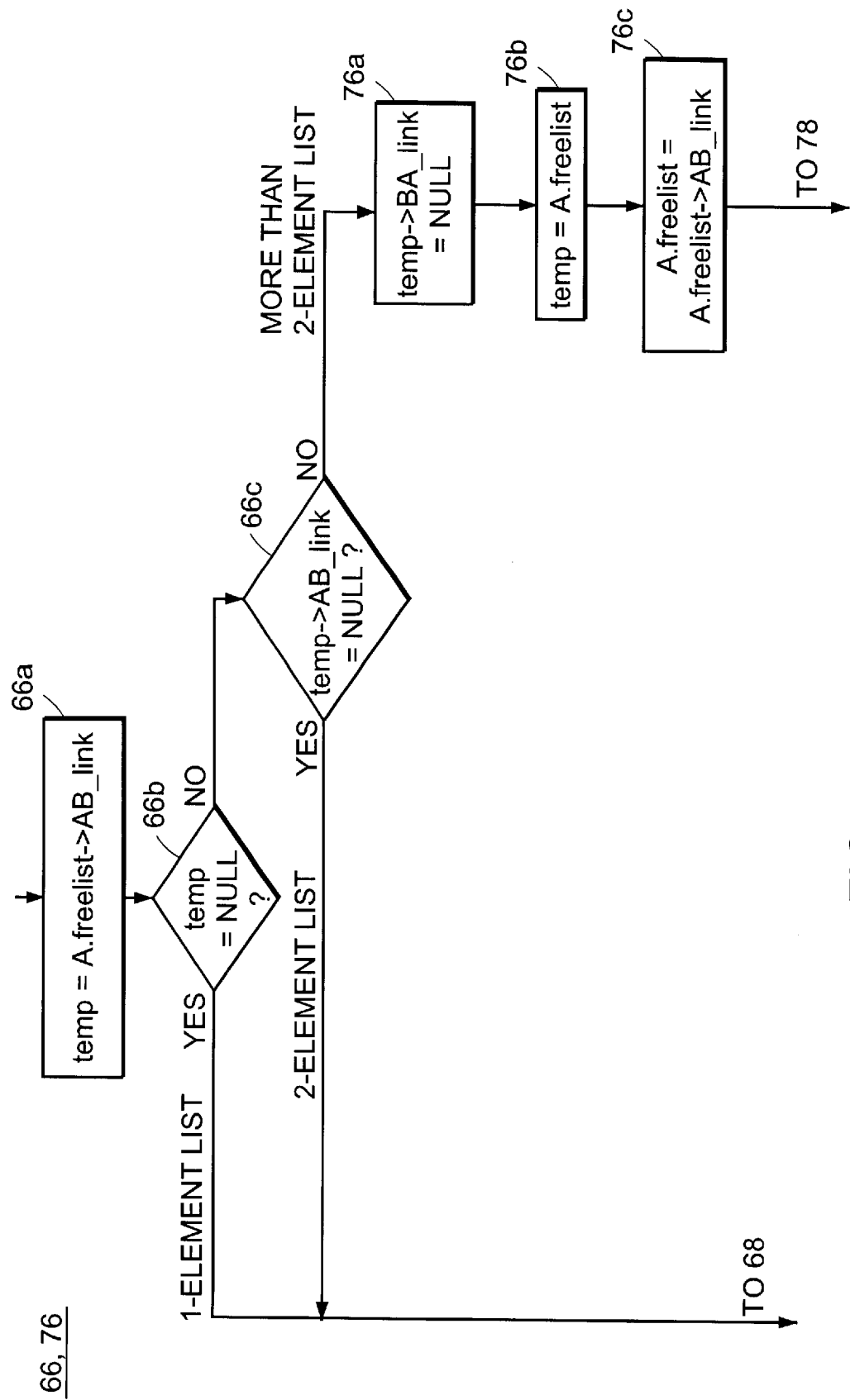
FIG. 5 is a flowchart of an embodiment of a method for determining if there are more than two free message buffers in the free list of available message buffers and removing the message buffer from an end of the free list.

Referring now to FIG. 5, a flowchart of an embodiment of a method for performing steps 66 and 76 as described in FIG. 4 are shown. In particular, FIG. 5 depicts performing steps 66 and 76 of FIG. 4 upon the particular embodiment of the data structures previously shown in conjunction with FIG. 3. At step 66*a*, a temp pointer receives the contents of the AB_link field of the first message buffer that indicates the second message buffer, if any, of the free message buffer list 38*c*. A determination is made at step 66*b* as to whether or not the temporary pointer is NULL. If the temporary pointer is NULL, it indicates that there is one message buffer in the free message buffer list 38*b*. If the temp pointer is not NULL, control proceeds to step 66*c*. Prior to executing step 66*c*, it is known that the free message buffer list contains at least two elements. At step 66*c*, a determination is made as to whether or not the free message buffer list contains at least three message buffers. This is determined by examining the AB link field of the message buffer identified by the temp pointer, since temp points to the second element of the list. If the AB link field of the message buffer identified by the temp pointer is not NULL, it indicates that a third message buffer is contained in the message buffer list. Thus, at step 66*c* if a determination is made that the AB link field of the message buffer identified by the temp pointer is not NULL, control proceeds to step 76*a* to remove the first message buffer from the free message buffer list 38*c*. If step 66*c* determines that there are not at least three message buffers in the free message buffer list, control proceeds to step 68.

At step 76*a* the BA link field of the message buffer pointed to by temp is assigned a value of NULL to remove the element from the free message buffer list 38*c*. At step 76*b* the temp pointer is assigned to point to the message buffer identified by A.freelist which is the message buffer just allocated or removed from the free message buffer list 38*c*. At step 76*c* process A's MMI freelist field 40*c* is updated to point to the next message buffer of the list 38*c* available for use by process A.

Figure 6B:
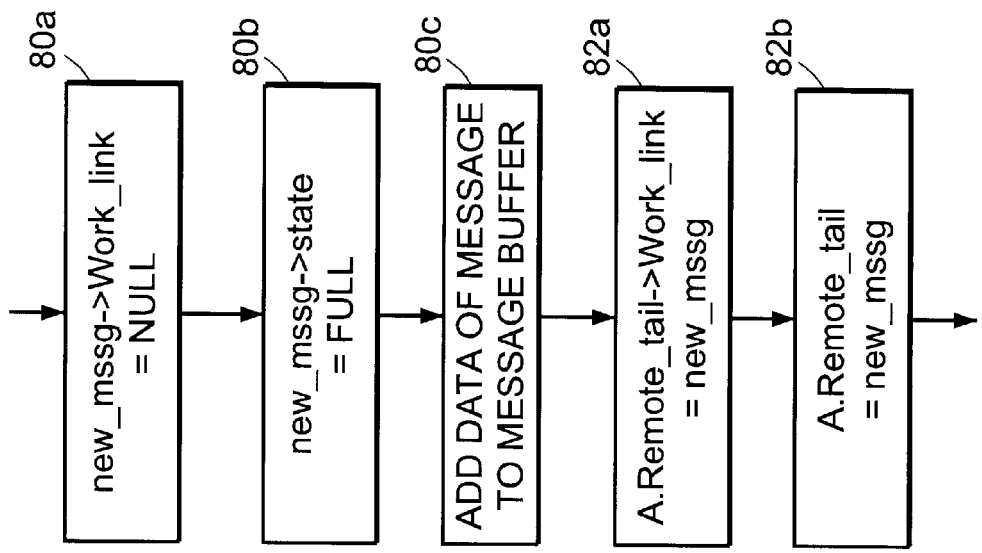
FIG. 6B is a flowchart of an embodiment of a method depicting detailed steps of FIG. 6A for initializing a new message buffer and updating process A's pointer information.
Figure 6A:
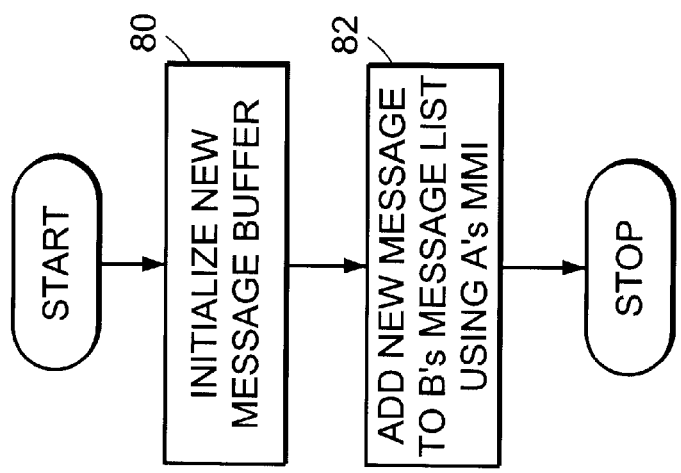
FIG. 6A is a flowchart of an embodiment of a method for sending messages from process A to process B.

Referring now to FIG. 6A, a flowchart of an embodiment of the method steps for sending a message from process A to process B is shown. At step 80 a new message buffer is initialized. The new message buffer initialized in step 80 is allocated from the free message buffer list using the steps previously described in conjunction with FIGS. 4 and 5. At step 82 the new message initialized in step 80 is added to process B's message list 38*b* using A's MMI information 40.

Referring now to FIG. 6B, a flowchart of an embodiment of a method for performing the steps previously described in conjunction with FIG. 6A are shown in more detail when using the data structures previously described in conjunction with FIG. 3 of this particular embodiment.

In steps 80*a*–80*c*, the new message buffer is initialized. In step 80*a*, its work link field is initialized to NULL. In step 80*b*, its state field is set to FULL. At step 80*c*, the data of the message is added to the new message buffer. Steps 82*a*–82*b* add the new message buffer to process B's message list 38*b* using process A's MMI 40. The new message buffer is added to the tail of process B's message list. Using the remote tail field 40*b*, the work link field of the last message buffer contained in process B message list 38*b* is updated to point to the new message buffer. At step 82*b*, A's MMI information is updated such that the remote tail of process A's MMI 40 points to the new message buffer just added to the tail of process B's message list 38*b*.

Using the data structures of FIG. 3 as previously described, new messages, as sent from process A to process B, are added or appended to the tail of the receiving process's message list by the sending process using its MMI.

Figure 7A:
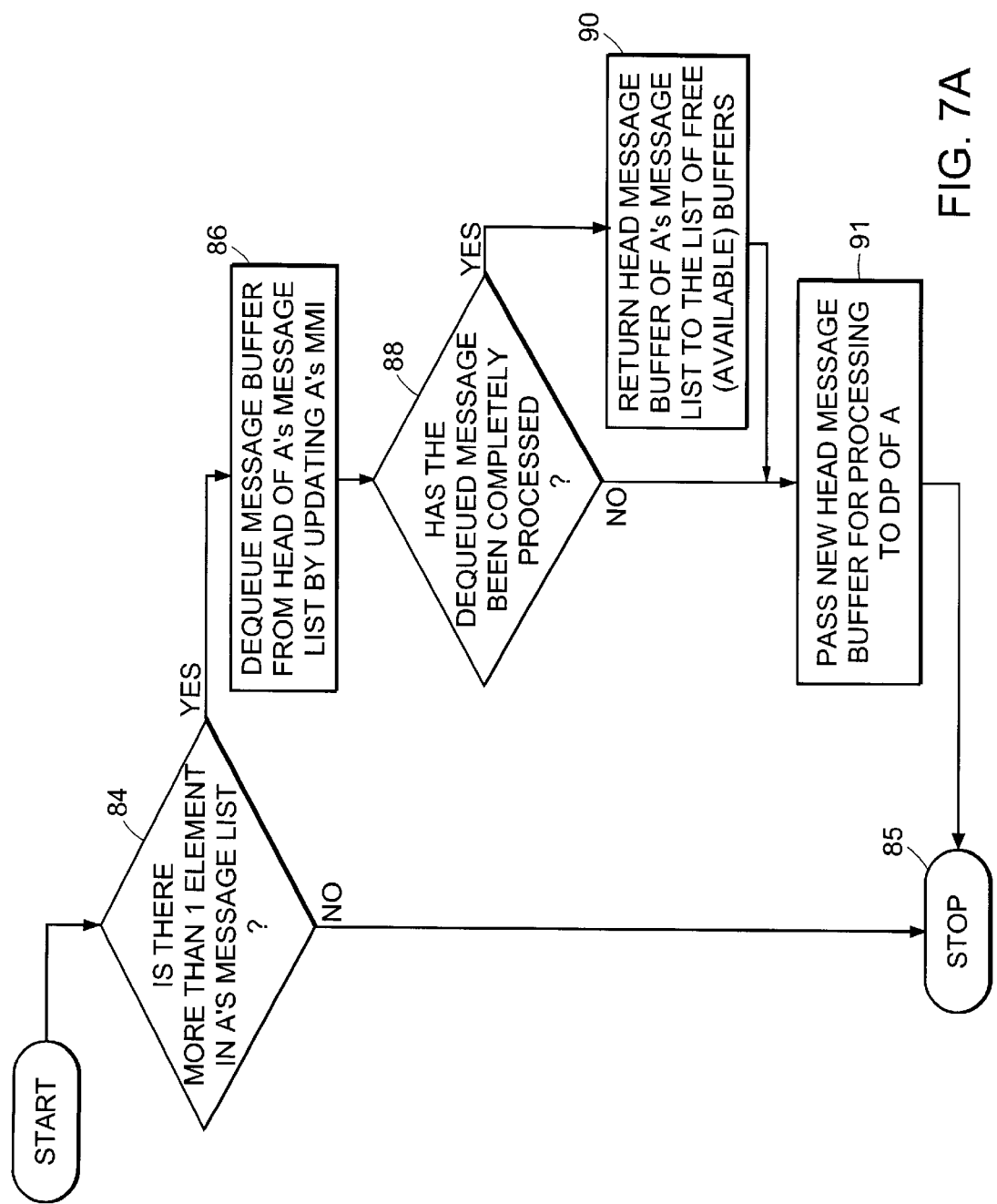
FIG. 7A is a flowchart of an embodiment of a method for retrieving a message from process A's message list.

Referring now to FIG. 7A, a flowchart of an embodiment of a method for retrieving a message from a message list is shown. In particular, the method steps of FIG. 7A depict retrieving a message received by process A from process B. At step 84 a determination is made as to whether or not there is more than one message buffer in process A's message list 38*a*. In accordance with principles of the invention, each process's message list, such as 38*a* and 38*b*, always contains at least one element. If a determination at step 84 indicates that there is more than one message buffer included in A's message list 38*a*, then a message is returned for processing and an attempt is made to free a message buffer from A's message list 38*a*. However, if there is only a single message buffer in process A's message list 38*a*, control proceeds to step 85 where the method terminates.

If a determination is made at step 84 that process A's message list 38*a* contains more than one message buffer, control proceeds to step 86. At step 86, the message buffer from the head of process A's message list is disconnected from the remaining portion of A's message list by updating A's MMI. At step 88 a determination is made as to whether or not the message buffer disconnected in step 86 has been processed to completion. If a determination is made at step 88 that the message has not been processed to completion, control proceeds to step 91 where the new head of A's message list is passed to process A's DP portion. In other words, if A is not done processing the message buffer, it cannot yet be returned to the free list as available for use. If a determination is made at step 88 that the message has been processed, control proceeds to step 90 where the dequeued prior head message of A's message list 38*a* is returned to the free message buffer list 38*c*. At step 91, the new head message buffer of A's message list is passed to A's DP for processing.

Figure 7B:
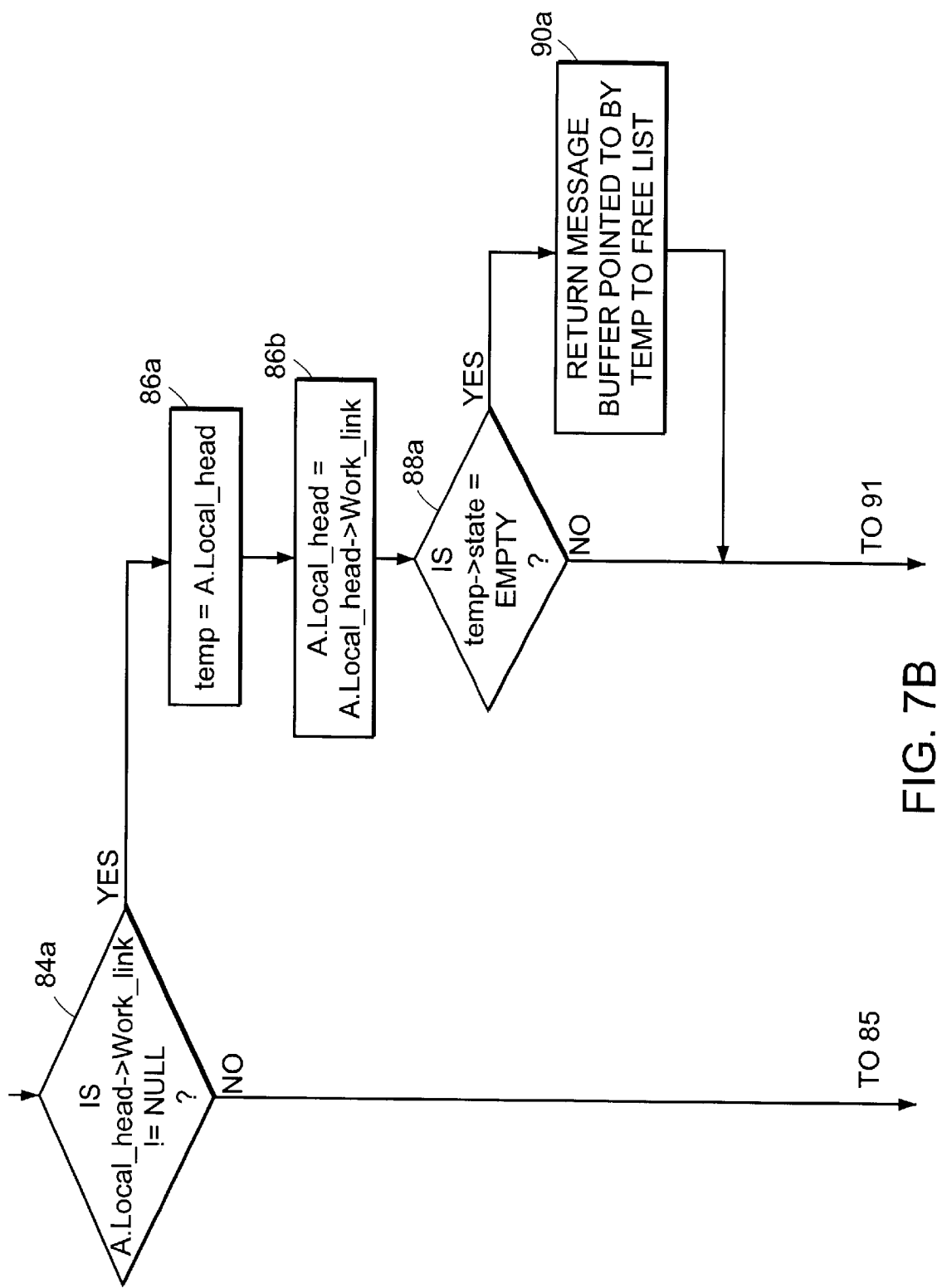
FIG. 7B is a flowchart of an embodiment of a method for performing more detailed steps from FIG. 7A for retrieving a message from A's message list.

Referring now to FIG. 7B, a flowchart of an embodiment of a method for retrieving a message received by process A from process B is shown in which the method uses the data structures previously described in conjunction with FIG. 3. At step 84*a*, a determination is made using the data structures of FIG. 3 as to whether or not there is more than one message buffer in process A's message list 38*a*. This is determined by examining the work link field of the message buffer identified by the local head field 40*a* of process A's MMI data structure 40. If this work link field is NULL, control proceeds to step 85. If this work link field is not NULL, control proceeds to step 86*a* where a temp pointer is used to identify the first message buffer on process A's message list 38*a*. At step 86*b*, the first message buffer in process A's message list is disconnected from the remainder of A's message list by updating A's MMI field local head 40*a* to point to the next consecutive message buffer in process A's message list. At step 88*a*, a determination is made as to whether or not the disconnected first message buffer identified by the temp pointer has been processed. This is done by examining the state field of the message buffer identified by the temp pointer. If the state field is EMPTY, it indicates that this message has been processed and control proceeds to step 90*a* where the message buffer pointed to by temp can be returned to the free message buffer list 38*c*. In either case, control proceeds to step 91 in which, as previously described in conjunction with FIG. 7A, the new head message buffer is returned to the DP portion of process A for processing.

Figure 7D:
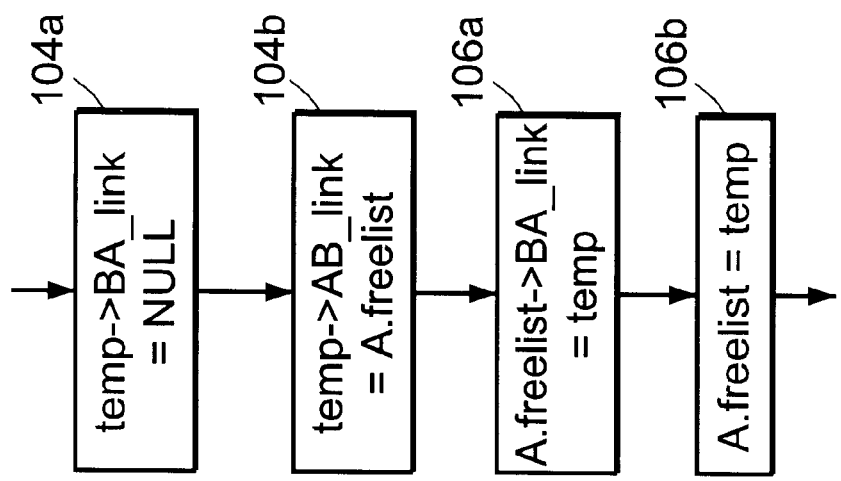
FIG. 7D is a flowchart of an embodiment of a method for performing more detailed steps from FIG. 7C for returning a message buffer to the free list.
Figure 7C:
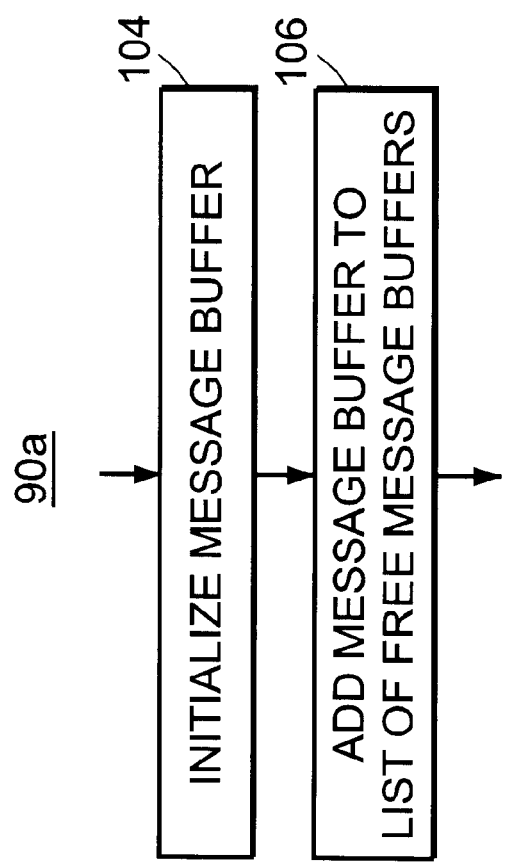
FIG. 7C is a flowchart of an embodiment of a method for performing more detailed steps from FIG. 7B for returning a message buffer to the free list.

Described in conjunction with FIG. 7C in following text are details of step 90*a* for returning a message buffer identified by the temp pointer of step 90*a* to the free message buffer list.

Referring now to FIG. 7C, a flowchart of an embodiment of a method for performing step 90*a* of FIG. 7B is shown in which a message buffer pointed to by temp is returned to the message buffer free list. At step 104, the link fields (i.e., AB-link and BA-link) are reinitialized and the message buffer is added to the free message buffer list, as in step 106.

Referring now to FIG. 7D, a flowchart of an embodiment of a method depicting more detail of steps 104 and 106 from FIG. 7C for returning a message buffer to the A end of the free message buffer list is shown. At steps 104*a* and 104*b*, the message buffer identified by temp is initialized. This initialization includes initializing the BA link field to NULL, as in step 104*a*, and setting the AB link field to identify the first message buffer currently on the free message buffer list at the A end of the free message buffer list, as in step 104*b*. The message buffer identified by temp is added to the free message buffer list. The BA link field of the message buffer identified by the freelist field of A's MMI is set to point to the message buffer identified by temp, as in step 106*a*. At step 106*b*, the freelist field 40*c* of process A's MMI is set to identify the new first message buffer available for use by assigning it the value contained in temp.

Figure 8A:
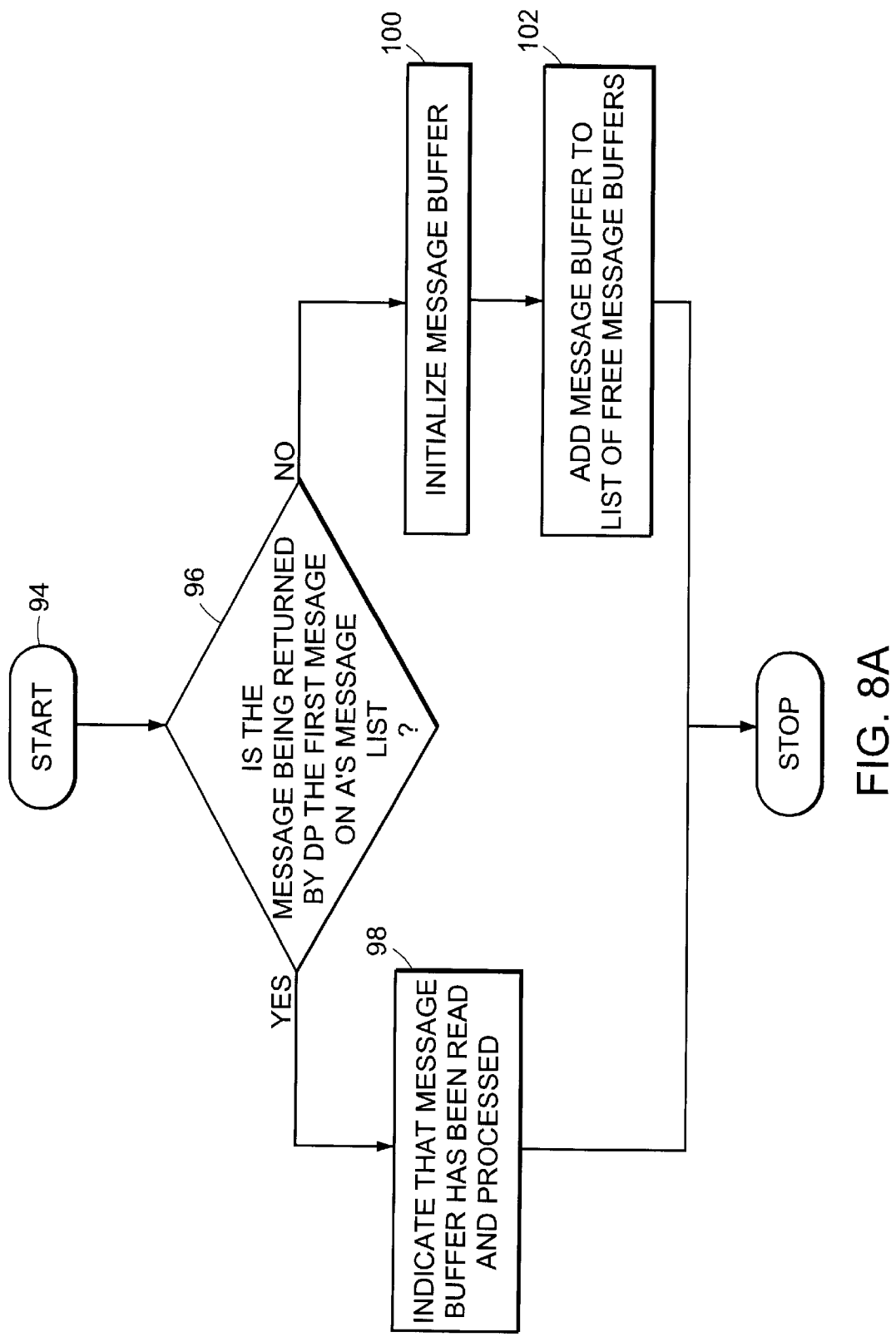
FIG. 8A is a flowchart of an embodiment of a method performed upon completion of processing a message buffer for handling message buffers after message processing is complete.

Referring now to FIG. 8A, a flowchart of an embodiment of a method for handling message buffers returned after data processing is complete is shown. As will be described in paragraphs that follow, this method includes steps for returning a message buffer to the message buffer free list in accordance with conditions and principles of the invention.

At step 96 a determination is made as to whether or not the message buffer which will possibly be returned to the free list is still the head of the process A message list 38*a*. If a determination is made at step 96 that an attempt is being made to return the first message buffer being processed by process A to the free message buffer list 38*c*, control proceeds to step 98. At step 98, a flag is set to indicate that the first message buffer has been read and processed, yet the first message buffer is not yet removed from process A's message list 38*a*. If a determination is made at step 96 that the first message buffer of process A's message list 38*a* is not the message attempting to be returned to the free list 38*c*, control proceeds to step 100 where the message buffer link fields (i.e, AB link, and BA_link) are reinitialized and added to the free message buffer list 38c in step 102.

Referring now to FIG. 8B, the method steps of FIG. 8A are shown as used in this particular embodiment with the data structures of FIG. 3. At step 96a, a determination is made as to whether an attempt is being made to return to the free message buffer list 38c, the head of process A's message list 38a. This is done at step 96a by comparing the address identified by a buf_ptr, a pointer, which identifies the address of a message buffer attempting to be returned to the free message buffer list, to the address identified by the local head field 40a of process A's MMI. If a determination is made that these addresses are not the same, control proceeds to step 100a.

At steps 100a and 100b, the message buffer identified by buf_ptr is initialized. At step 100a, the BA link field is initialized to NULL, and at step 100b the AB link field is set to identify the first message buffer currently on the free message buffer list 38c from the A end of the free message buffer list. At step 102a, the BA link field of the message buffer identified by the freelist field of A's MMI is set to point to the message buffer identified by buf_ptr. At step 102b, the freelist field 40c of process A's MMI is set to identify the new first message buffer available for use by assigning it the value contained in buf_ptr.

In summary, the methods depicted in FIGS. 7A, 7B, 7C, 7D, 8A and 8B may be performed by the queue manager in this embodiment, such as queue manager 32b to retrieve a message for processing by the DP portion 32a, or after a message is returned by the DP portion 32a to the queue manager 32b. The method steps of the foregoing FIGS. provide for two particular points, as summarized below, at which a message buffer may be returned to the message buffer free list.

The method steps of FIGS. 7A–7D may be performed when a message is retrieved by the queue manager for processing by DP. A message buffer may be returned to the free list at a first particular processing point when performing these method steps. A preferred embodiment may have multiple messages being processed resulting in multiple outstanding message buffers. Thus, in these foregoing FIGs a determination is made to see if a message buffer which was previously being processed may be returned to the free list provided that there is more than one element in a process' message buffer list.

The method steps of FIGS. 8A and 8B may be performed when the DP portion of a process has completed processing of a message. In performing these method steps, a message buffer may also be returned to the message buffer free list if certain conditions are satisfied at a second particular processing point. In accordance with these methods previously described, if there is only one message buffer remaining on the process message list (such as message lists 38a and 38b) when DP has complete processing, the message buffer which is the only one on the process message list is not returned to the free message buffer list. If the message being returned is not the head of the process message list, then the message buffer which contains the message just processed by DP is returned to the free message buffer list.

Included below is a C-style pseudo code description of the methods previously described in conjunction with FIGS. 4, 5, 6A, 6B, 7A–7D, 8A and 8B using the data structures described in conjunction with FIG. 3.

```
/data declarations/
 typedef volatile struct work         WORK_ENTRY;
 struct work (
    int               state;          /* EMPTY or FULL */
    WORK_ENTRY   *workLink;           /* next on work queue */
    WORK_ENTRY   *ABfreeLink;         /* next free entry in AB
                                         direction */
    WORK_ENTRY   *BAfreeLink;   /* next free entry in BA
                                   direction */
    uint32 body[BODY_SIZE];     /* for some specified
                                   BODY_SIZE */
 }WORK_ENTRY
 typedef struct queue_head {
    WORK_ENTRY   *localHead;
    WORK_ENTRY   *remoteTail;
    WORK_ENTRY   *freeList;
 } HEADER;
 HEADER A_side, B_side;
 AllocateAB() - remove the buffer at the A-end of the free list if
 it points to another free entry.
               /** FIG. 4 and 5 method steps */
 {
        WORK_ENTRY *temp;
        /* use temp to avoid possible conflict from reading
        ABfreeLink twice */
        temp = A_side.freelist->ABfreeLink;
        if (temp != NULL)                    /* not a 1 element list */
           if (temp ->ABfreeLink ! = NULL) {  /* not a 2 element
                                                list */
               temp ->BAfreeLink = NULL;     /* remove from
                                                list*/
               temp = A_side.freelist;
               A_side.freelist = A_side.freelist->ABfreeLink;
               return(temp) ;
           }
        /* at this point, an additional buffer can be allocated and
           it
        /* will augment the free buffer pool, or several can be
        /* allocated and all but one added to the free list.
           Lastly,
        /* if sufficient resources have already been allocated, a
           NULL
        /* can be returned to tell the requestor to try again later.
        */
        return (get_buffer_from_system() );
 }
 Send_to_B (WORK_ENTRY *buf_ptr) - enqueue full buffer on
 B-workq
                                /** FIG. 6A, 6B method steps **/
 {
    buf_ptr->workLink = NULL;
    buf_ptr->state = FULL;
    A_side.remoteTail->workLink = buf_ptr;
    A_side.remoteTail = buf_ptr;
 }
 Receive_from_B() -   if the local work queue contains more than one
                      buffer, dequeue the buffer at the head of the
                      queue; if that buffer was EMPTY, return it to
                      the free queue; return the address of the
                      buffer now at the head of the work queue.
                      Otherwise, return NULL.
 {
 WORK_ENTRY *temp;         /** FIGS. 7A, 7B, 7C, 7D method
                              steps **/
    if (A_side.localHead->workLink != NULL) {
       temp = A_side.localHead;
       A_side.localHead = A_side.localHead->workLink;
       if (temp->state == EMPTY) {
          temp->BAfreeLink = NULL;
          temp->ABfreeLink = A_side.free_list;
          A_side.freeList->BAfreeLink = temp;
          A_side.freeList=temp;
       }
       return (A_side.localHead);
    } else return (NULL);
 }
 A_end_free (WORK_ENTRY *buf_ptr) - if buf_ptr is not the head
          of the work queue, push onto the free list, else mark it
          EMPTY
```

```
{                          /** FIGS. 8A, 8B method steps **/
    if (buf_ptr <> A_side.localHead) {
        buf_ptr->BAfreeLink = NULL;      /* initialize
                                            pointer fields in
                                            buffer */
        buf_ptr->ABfreeLink = A_side.freeList;
        A_side.freeList->BAfreeLink = buf_ptr; /* append to
                                                  list */
        A_side.freeList = buf_ptr;
    } else
        A_side.localHead->state = EMPTY;
}
```

It should be noted that various aspects of the foregoing description may vary with implementation of the principles of the invention. For example, in the foregoing embodiment each of processes A and B include a DP portion and a queue manager portion. Allocated to each of these portions are various tasks accomplished by performing method steps previously described. Other implementations applying the principles of the invention described in the foregoing embodiment may include a process with different portions and different task allocations in accordance therewith as known to those skilled in the art.

The foregoing description affords a flexible and efficient technique for providing bidirectional message communication as between processes using a shared pool of message buffers in a synchronized manner. The foregoing technique does not require expensive, global locking mechanisms as those of the prior art, and includes adaptive buffer allocation techniques which minimize memory requirements while simultaneously avoiding the problem of uneven message flow as between processes A and B. The foregoing technique can easily be tuned for a variety of particular implementations, operating systems, and computer systems.

Techniques used in the previously described embodiment generally promote efficient use of system resources, such as memory and processor time, and are scalable for use in a system having many user processes, as well as a single user process, and a single processor or a multiprocessor computer system.

Having described preferred embodiments of the invention, it will now become apparent to those of skill in the art that other embodiments incorporating its concepts may be provided. It is felt, therefore, that this invention should not be limited to the disclosed embodiment, but rather should be limited only by the scope of the appended claims.

What is claimed is:

1. A method executed in a computer system for sending a message from a first process to a second process and synchronizing access to the message by the first process and the second process, absent a global locking mechanism, the method comprising the steps of:
    initializing a first message buffer associated with message data to be sent to the second process by the first process, said initializing step including:
        setting a first state field indicating that said first message buffer contains a message that has not been processed by the second process; and
        setting a first link field to indicate that said first message buffer is the last message in a list of incoming messages to the second process;
    adding said first message buffer to said list of incoming messages to the second process, said list of incoming messages including a second message buffer, said adding step including:
        updating a second link field associated with said second message buffer to identify said first message buffer; and
    retrieving said first message buffer from said list of incoming messages to the second process only if more than one message buffer exists on said list of incoming messages to the second process, thereby providing synchronized access to said first message buffer by the first process and the second process, absent the global locking mechanism.

2. The method of claim 1 further including the step of releasing said second message buffer to a free list for reuse in sending another message, said step of releasing said second message to a free list including the steps of:
    setting a second state field indicating that said second message buffer has been processed by the second process;
    determining if said second message buffer is at the head of said list of incoming messages; and
    releasing said second message buffer to a free list for reuse if said second message buffer is absent from the head of said list of incoming messages.

3. The method of claim 1 wherein said first process and said second process each include a data processing portion for processing incoming messages, and a queue manager portion for managing said list of incoming messages.

4. The method of claim 1 further including allocating a third message buffer from a free list of message buffers when sending a message between the first process and the second process, said allocating step further comprising:
    determining, by examining only said free list of message buffers, if said free list includes at least three message buffers, each message buffer of said free list including a first pointer field used by said first process to determine a next message buffer available for use by the first process, and a second pointer field used by said second process to determine a next message buffer available for use by the second process; and
    removing said message buffer from one end of said free list if said free list includes at least three message buffers.

5. The method of claim 4, wherein said step of determining if said free list includes at least three message buffers further includes the steps of:
    using said first pointer field of a first message buffer included in said free list to determine if there are at least two message buffers in said free list; and
    using said first pointer field of a second message buffer included in said free list to determine if there are at least three message buffers in said free list.

6. An apparatus for sending a message from a first process to a second process, and synchronizing access to the message by the first process and the second process, absent a global locking mechanism, the apparatus comprising:
    means for initializing a first message buffer associated with message data to be sent to the second process by the first process, said initializing means including:
        means for setting a first state field indicating that said first message buffer contains a message that has not been processed by the second process; and
        means for setting a first link field to indicate that said first message buffer is the last message in a list of incoming messages to the second process;
    means for adding said first message buffer to said list of incoming messages to the second process, said list of incoming messages including a second message buffer, said adding means including:

means for updating a second link field associated with said second message buffer to identify said first message buffer; and means for retrieving said first message buffer from said list of incoming messages to the second process only if more than one message buffer exist on said list of incoming messages to the second process, thereby providing synchronized access to said first message buffer by the first process and the second process, absent the global locking mechanism.

7. The apparatus of claim 6 further including:

means for releasing said second message buffer to a free list for reuse in sending another message, said means for releasing said second message to a free list including:

means for setting a second state field indicating that said second message buffer has been processed by the second process;

means for determining if said second message buffer is at the head of said list of incoming messages; and means for releasing said second message buffer to a free list for reuse if said second message buffer is absent from the head of said list of incoming messages.

8. The apparatus of claim 6, wherein said first process and said second process each include a data processing portion for processing incoming messages, and a queue manager portion for managing said list of incoming messages.

9. The apparatus of claim 6 further comprising:

a first data structure associated with the first process, said first data structure including a remote tail pointer identifying an incoming message list associated with the second process, said incoming message list including at least one message buffer containing message data being sent from the first process to the second process;

a second data structure associated with the second process, said second data structure including a head pointer to said incoming message list associated with the second process;

a message buffer data structure associated with a message buffer, said message buffer data structure including:

a link field identifying a next message buffer of said incoming message list; and a state field indicating whether said message buffer has been processed by said second process.

10. The apparatus of claim 6 further comprising:

a first list of incoming messages buffers, each message buffer of said first list including message data sent from the first process to the second process, said first list including at least one message buffer;

a second list of incoming message buffers, each message buffer of said second list including message data sent from the second process to the first process, said second list including at least one message buffer;

a first data structure including message management information for managing said first list of incoming messages;

a second data structure including message management information for managing said second list of incoming messages;

a third list of message buffers, each of said message buffers of said third list being available for sending a message between the first and second processes, said third list being accessed by the first and second processes and including at least one message buffer;

wherein each of said message buffers included in said first list, said second list, and said third list include:

a first process link field used exclusively by the first process to determine a next available message buffer of said third list for use by said first process;

a second process link field used exclusively by the second process to determine a next available message buffer of said third list for use by said second process;

a message list link field identifying a next message buffer in said first and said second lists; and a state field indicating whether said each message buffer includes message data to be processed; and said first data structure includes:

a head field identifying a head message buffer at the front of said first list;

a remote tail field identifying a last message buffer at the end of said second list; and a free list field identifying a free message buffer available for use by the first process; and said second data structure includes:

a head field identifying a head message buffer at the front of said second list;

a remote tail field identifying a last message buffer at the end of said first list; and a free list field identifying a free message buffer available for use by the second process.

11. A memory included in a computer system providing for sending a message from a first process to a second process and synchronizing access to the message by the first process and the second process, absent a global locking mechanism, the memory comprising:

means for initializing a first message buffer associated with a message data to be sent to a second process by a first process, said initializing means including:

means for setting a first state field indicating that said first message buffer contains a message that has not been processed by the second process; and means for setting a first link field to indicate that said first message buffer is the last message in a list of incoming messages to the second process;

means for adding said first message buffer to said list of incoming messages to the second process, said list of incoming messages including a second message buffer, said adding means including:

means for updating a second link field associated with said second message buffer to identify said first message buffer; and means for retrieving said first message buffer from said list of incoming messages to the second process only if more than one message buffer exists on said list of incoming messages to the second process, thereby providing synchronized access to said first message buffer by the first process and the second process, absent the global locking mechanism.

12. The apparatus of claim 11 further including:

means for releasing said second message buffer to a free list for reuse in sending another message, said means for releasing said second message to a free list including:

means for setting a second state field indicating that said second message buffer has been processed by the second process;

means for determining if said second message buffer is at the head of said list of incoming messages; and means for releasing said second message buffer to a free list for reuse if said second message buffer absent from the head of said list of incoming messages.

13. The memory of claim 11, wherein said first process and said second process each include a data processing portion for processing incoming messages, and a queue manager portion for managing said list of incoming messages.

14. The memory of claim 11 further comprising:
- a first list of incoming messages buffers, each message buffer of said first list including message data sent from the first process to the second process, said first list including at least one message buffer;
- a second list of incoming message buffers, each message buffer of said second list including message data sent from the second process to the first process, said second list including at least one message buffer;
- a first data structure including message management information for managing said first list of incoming messages;
- a second data structure including message management information for managing said second list of incoming messages;
- a third list of message buffers, each of said message buffers of said third list being available for sending a message between the first and second processes, said third list being accessed by the first and second processes and including at least one message buffer;
- wherein each of said message buffers included in said first list, said second list, and said third list include:
  - a first process link field used exclusively by the first process to determine a next available message buffer of said third list for use by said first process;
  - a second process link field used exclusively by the second process to determine a next available message buffer of said third list for use by said second process;
  - a message list link field identifying a next message buffer in said first and said second lists; and
  - a state field indicating whether said each message buffer includes message data to be processed; and
- said first data structure includes:
  - a head field identifying a head message buffer at the front of said first list;
  - a remote tail field identifying a last message buffer at the end of said second list; and
  - a free list field identifying a free message buffer available for use by the first process; and
- said second data structure includes:
  - a head field identifying a head message buffer at the front of said second list;
  - a remote tail field identifying a last message buffer at the end of said first list; and
  - a free list field identifying a free message buffer available for use by the second process.

15. The memory of claim 11 further comprising:
- a first data structure associated with a first process, said first data structure including a remote tail pointer identifying an incoming message list associated with a second process, said incoming message list including at least one message buffer containing message data being sent from the first process to the second process;
- a second data structure associated with the second process, said second data structure including a head pointer to said incoming message list associated with the second process;
- a message buffer data structure associated with a message buffer, said message buffer data structure including:
  - a link field identifying a next message buffer of said incoming message list; and
  - a state field indicating whether said message buffer has been processed by said second process.

* * * * *